United States Patent [19]

Koike

[11] Patent Number: 4,670,867

[45] Date of Patent: Jun. 2, 1987

[54] SIMPLIFIED SOUND REPRODUCING DEVICE HAVING A PLURALITY OF EXTERNAL SHAFT CORRESPONDING TO THE RECORDED ITEMS

[75] Inventor: Eishi Koike, Sagamihara, Japan

[73] Assignee: Ozen Corporation, Tokyo, Japan

[21] Appl. No.: 833,839

[22] Filed: Feb. 26, 1986

[30] Foreign Application Priority Data

Feb. 27, 1985 [JP] Japan .................................. 60-37890

[51] Int. Cl.$^4$ ........................ G11B 25/04; A63H 5/00; A63H 29/00
[52] U.S. Cl. ........................................ 369/65; 369/67; 446/302
[58] Field of Search ....................... 369/63, 65, 66, 67; 446/299, 302

[56] References Cited

U.S. PATENT DOCUMENTS

| | | | |
|---|---|---|---|
| 2,978,836 | 4/1961 | Kato | 369/67 |
| 3,590,525 | 7/1971 | Tomare | 369/67 |
| 4,055,351 | 10/1977 | Hughes | 369/67 |
| 4,524,437 | 6/1985 | Koike | 369/67 |

*Primary Examiner*—Steven L. Stephan
*Attorney, Agent, or Firm*—Basile Weintraub Hanlon

[57] ABSTRACT

A simplified sound reproducing device having external output shafts disposed beneath the plane of rotation of the record disc at positions corresponding to the end point of sound reproduction of each record groove and which actuate predetermined external components corresponding to the record groove's recorded content previously reproduced. A transmission selectively connects a center pin to each of the external output shafts. This transmission includes a driving wheel fixed around the center pin, a revolvable bearing frame member carrying a planetary shaft and capable of rotation together with the center pin when engaged with a coupling member, a planetary gear wheel supported by the planetary shaft capable of rotational and axial movement; and pair of guide members allowing said planetary wheel to mesh with the driving wheel and fixedly disposed to the center pin, one at a position axially in front of and the other axially behind the driving wheel to hold the planetary wheel from both sides and to urge it to move axially with the driving wheel, driven wheels fixedly coupled to the external output shafts capable of meshing with the planetary wheel when the driving wheel and the planetary wheel are in an advanced position, and out of engagement with the planetary wheel, when the driving wheel and the planetary wheel are in a retracted position. The coupling member is constructed such that the revolvable bearing frame member can be stopped, regardless of the rotation of the center pin, when the center pin is in an advanced position.

7 Claims, 7 Drawing Figures

SIMPLIFIED SOUND REPRODUCING DEVICE HAVING A PLURALITY OF EXTERNAL SHAFT CORRESPONDING TO THE RECORDED ITEMS

BACKGROUND OF THE INVENTION

1. Field of the Invention

This invention relates to a sound reproducing device having a plurality of external output shafts each corresponding to one of a number of recorded items, and more particularly, to a sound reproducing device which is able to select and actuate a desired external output shaft for letting the external means, into which the reproducing device is incorporated, play a motion corresponding to the specific recorded item which has just been reproduced.

2. Description of the Prior Art

A sound reproducing device in connection with and similar to the present invention is disclosed, for example, in British Patent Specification No. 123865. In the device of that patent, a gear means is connected to a center pin such that a motor as a power source can drive through said center pin, a moving means other than the record disc, thereby actuating such moving means.

Japanese Laid-Open Patent Publication No. 60 (1985)-07601, discloses a sound reproducing device having an external output shaft, in which a pickup is constructed to fall into a recess or cavity after one of the recorded items has finished its reproduction, accompanying advance of the record disc together with the center pin fixed to the record disc, thus a gear fixed to the center pin engages or disengages a gear on an external output shaft. Incidentally, this laid-open patent application was made by the same inventor as the present invention and is considered the art most relevant to the present invention.

These devices described above are provided with a single output shaft, so they have not been able to select one external shaft from a plurality of external shafts in such a manner that the external means, into which the subject simplified sound reproducing means is incorporated, can play an action corresponding to the content of the respective recorded items, each having different meaning and recorded in each of the plural number of recorded grooves, immediately following reproduction of the selected recorded item.

However, there have recently been increasing demands for toys such as robots capable of uttering phrases with various content in meaning and then play various motions each corresponding to the phrases or words which the toy has just reproduced.

There has been a pending problem encountered in the aforesaid devices in that they cannot satisfy the user's above-mentioned demands.

Accordingly, an object of the present invention is to furnish an improved type of sound reproducing device having a plurality of external shafts driven by the power of the sound reproducing device itself, and enabling the external means to play various motions each corresponding to the content in each of the items to be reproduced.

Another object of the present invention is to provide a simplified sound reproducing device comprising a plurality of external shafts for performing reproduction of recorded material with corresponding motion in a sequential manner.

A further object of the present invention is to provide a simplified sound reproducing device constructed such that the motor housed therein is not loaded concurrently for reproducing the recorded item and driving the external means.

SUMMARY OF THE INVENTION

The present invention relates to a simplified sound reproducing device having a plurality of external output shafts each corresponding to the content of a recorded item.

Each external output shaft is disposed below the rotational plane of the record disc and at positions corresponding to the end points of each recorded groove. There are disposed a center pin and a transmission, functionally connecting said center pin to each of the external output shafts, respectively.

The transmission includes a driving wheel fixed around the center pin; a revolvable bearing frame member which is journally received so as to be rotated together with the center pin when engaged with a coupling member, when the center pin and the record disc are retracted against a stylus force spring by applying depression force with a depression pole; a planetary shaft carried by the revolvable frame; a planetary wheel supported by the planetary shaft capable of being movable in an axial direction and capable of being rotated while normally meshed with said driving wheel; a pair of guide members letting said planetary wheel mesh with said driving wheel and being fixed to said center pin at positions axially both in front of and behind the driving wheel so as to hold the planetary wheel from both sides and to force the planetary wheel to move axially with said driving wheel; driven wheels fixedly coupled to each external output shaft so that each may be meshed with said planetary wheel when both the driving wheel and the planetary wheel are in an advanced position, and out of engagement with said planetary wheel when the driving wheel and the planetary wheel together are placed in their retracted position.

The means for coupling is constructed in such a manner that said revolvable bearing frame member can be stopped, regardless of the rotation of the center pin, when said center pin is in its advanced position.

In addition, each of said external output shafts is designated a role to actuate external means to play the respective action corresponding to the item recorded in each of the record grooves, that is, the location of each external output shaft is set in the phase of rotation of the record disc, where both the driving wheel and the planetary wheel are allowed to move in an axially advancing direction together with the center pin, caused by the falling of the pickup into the stylus receiving recess formed at the end point of sound reproduction of the record disc, upon completion of each recorded item in the record grooves, within the rotational phase where said planetary wheel can engage the driven wheel fixed to the external output shaft corresponding to the recorded item previously reproduced.

When the pickup falls into the stylus receiving recess, after having finished any one of the sound reproductions by tracing the record groove, and the record disc is allowed to advance together with the center pin under force of a stylus force spring, the driving wheel and the guide members both being fixedly attached to the center pin also advance, that is, move upward.

The planetary wheel, journally received by the planetary shaft which is carried by the revolvable bearing frame and is movable in an axial direction, also advances in an axial direction, being guided by the guide members and meshed with the driving wheel, up to the axial position where the driven wheels are fixed to respective external output shafts. Subsequent revolution of the planetary wheel due to inertia or frictional force, will result in the planetary wheel meshing with the first driven wheel located along the path of revolution of the planetary wheel.

By this meshing, the external output shaft of the meshed driven wheel is geared in a driven state, and the coupling member is positioned such that the revolvable bearing frame member can be stopped, irrespective of whether the center pin rotates or not.

This can be done by releasing means for coupling the revolvable bearing frame member with the center pin in the direction of rotation, for example, in the case of frictional coupling means by letting the center pin rotate with a force exceeding the friction force, or in the case of a locking coupling means by allowing the projecting pole to withdraw from an aperture formed in the revolvable bearing frame. On the other hand, when the pickup is in the course of sound reproduction with the record disc and the center pin is held at a retracted position, that is, in a lower position, the revolvable bearing frame member is coupled with the center pin creating substantially one integral unit which moves in the direction of rotation. The position of the planetary wheel with respect to the phase of rotation of the record disc depends on the location where the end point of each record groove situates with respect to the phase of rotation drawn by the stylus receiving recess, in addition, since each of the external output shafts is positioned at a distance and with respect to the phase of rotation corresponding to the rotation of the revolvable bearing frame member, further slight rotation of revolvable bearing frame member due to inertia or friction force will bring the planetary wheel carried by the revolvable bearing frame member to the driven wheel carried by the external output shaft corresponding to the end point of sound reproduction on the record groove which has just reproduced the desired item.

Explanation will now be on the preferred embodiment of the present invention by referring to the accompanying drawings as mentioned above.

DETAILED DESCRIPTION OF THE PREFERRED EMBODIMENTS

Figure 1:
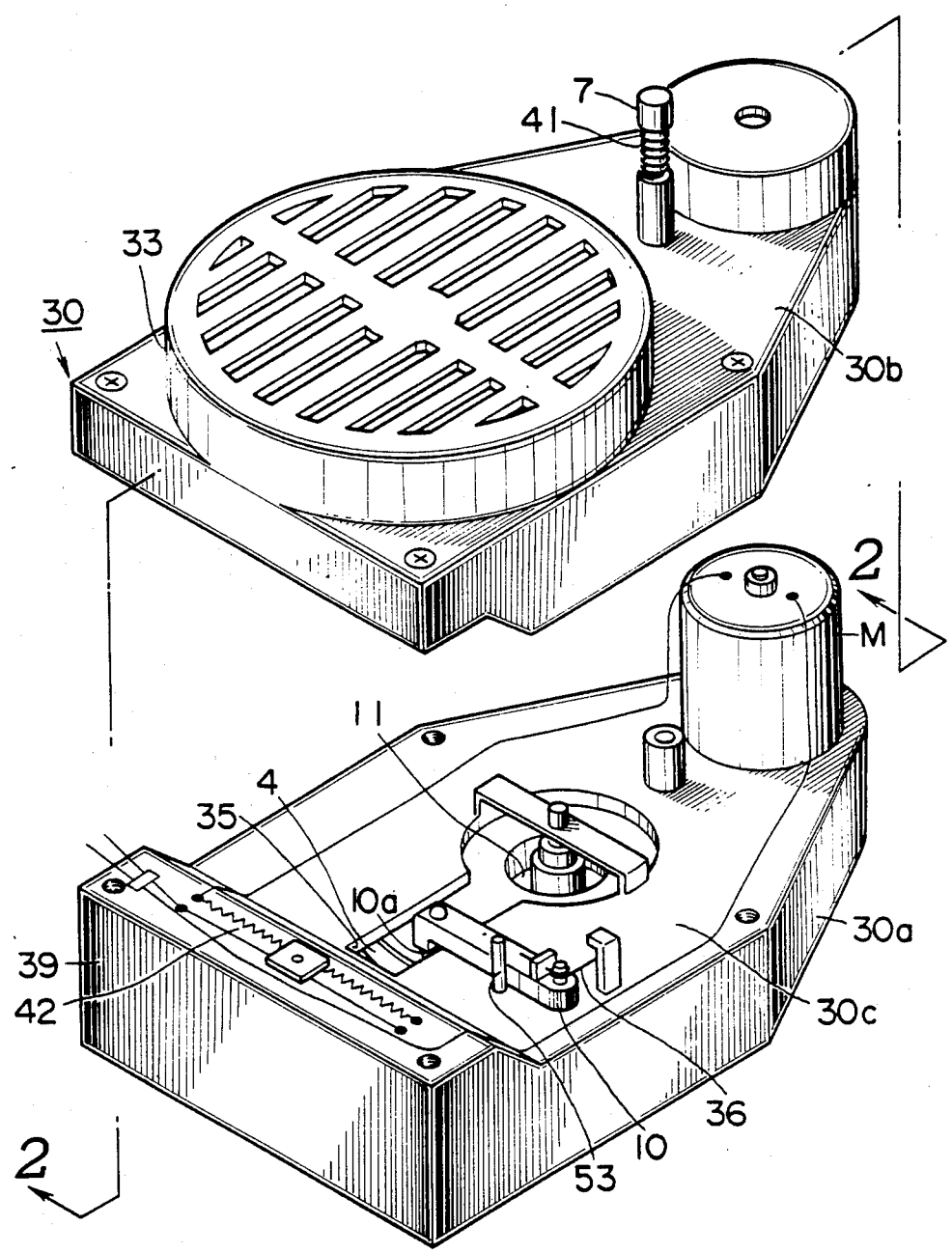
FIG. 1 is an exploded perspective view of an embodiment of the simplified sound reproducing device according to the present invention.
Figure 2:
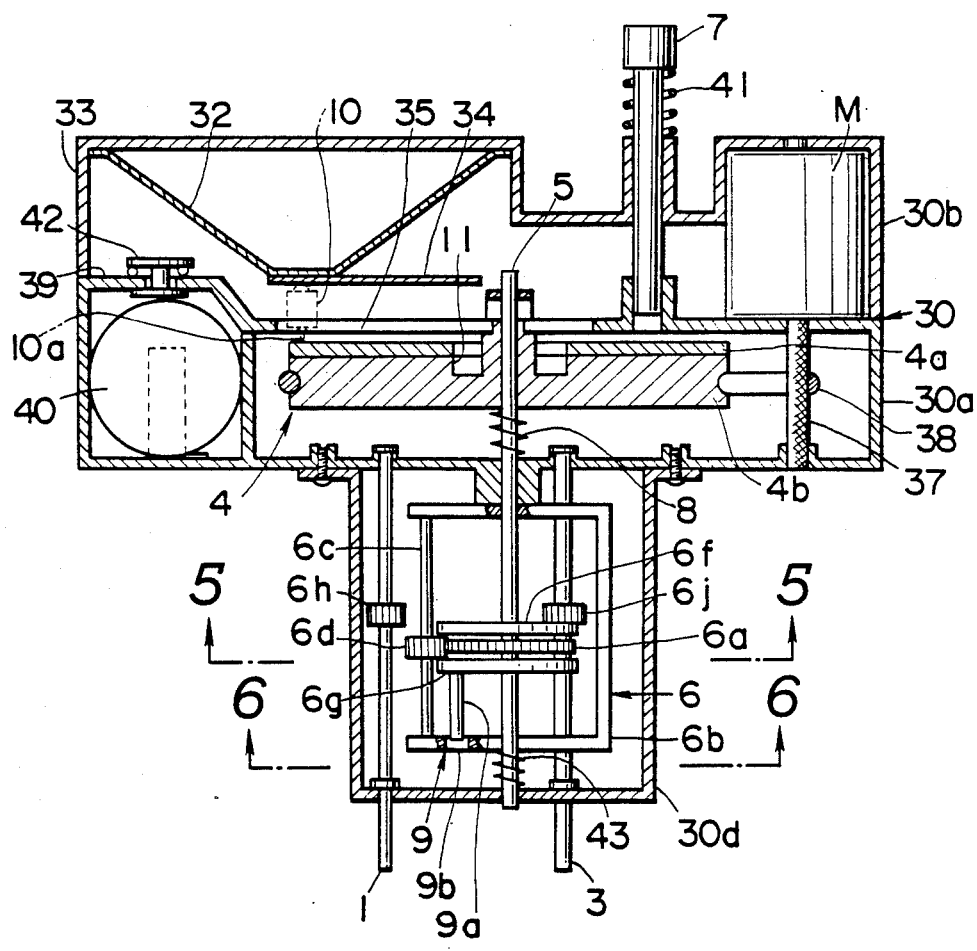
FIG. 2 is a sectional side view of the embodiment taken along line 2—2 of FIG 1.

FIG. 1 is an exploded perspective view showing an embodiment of the present invention and FIG. 2 is a sectional side view of the simplified sound reproducing device shown in FIG. 1 as assembled. As can be seen from these figures, a casing 30 consists of a portion comprising a chassis 30a, a housing 30b, and a portion of gear box 30d.

A diaphragm box 33 is formed on the housing 30b, within which a speaker diaphragm 32 is fixedly disposed. At the bottom of the speaker diaphragm 32, a sound transmitting member 34 is attached to extend horizontally therefrom.

On the upper end of the chassis 30a, a middle deck 30c is placed to extend in horizontal direction, onto which a pickup 10 is swingably attached at its rear end.

A reproduction stylus 10a projects downward from the forward tip end of the pickup 10. The pickup 10 can be rotated along the top plane of the middle deck 30c, and can be swung in the direction toward and away from said middle deck 30c.

Within the chassis 30a, a record disc 4 is received, having at its center a fixedly attached center pin 5, capable of being rotated in a horizontal direction and can be axially shifted. A stylus force spring 8 is shown in FIG. 2, by which the record disc 4 is normally biased resiliently toward the sound transmitting member 34.

The record disc 4 consists of a sound reproducing portion 4a and a turntable 4b. The top face of the sound reproducing portion 4a carries three record grooves 1a, 1b and 1c, which are involutely engraved. In this embodiment, a starting point of each record groove is placed at the outer periphery of the record disc 4 and an end point is positioned at the inner part near the central part of the record disc.

An annular recess having a flat bottom is formed at the central part of the record disc 4 to constitute a stylus receiving recess 11, that is, the portion into which the stylus can be dropped. Each end point of the record grooves 1a, 1b and 1c, respectively, is further guided to the stylus receiving recess 11.

The outer side periphery of the turntable 4b of the record disc is formed to be used as a pulley, and a groove is formed therearound for this purpose.

Under the portion of the middle deck 30c where the sound transmitting member 34 extends, an oblong aperture 35 is formed, through which the sound reproduction stylus 10a projecting from the tip end of the pickup 10 can proceed onto the record face of the sound reproducing portion 4a to engage any one of the record grooves 1a, 1b and 1c. Thus, the tip end of the pickup 10 is normally positioned between the sound transmitting member 34 and the record disc 4.

At the swing point at the rear end of the pickup 10, a return spring 36 is attached, by which the front tip end of the pickup 10 is normally biased resiliently in two directions, the first bias to move toward the starting point of sound reproduction and the second bias to move away from the record disc.

A motor M is fixedly mounted on the middle deck 30c, the output shaft 37 of which extends within the chassis 30a parallel to the center pin 5, with its side face to be confronted with the outer side periphery of the turntable 4b. In FIG. 2, a belt 38 extends between the output shaft 37 and the turntable 4b.

Depicted in FIGS. 1 and 2, a battery box 39 houses a battery 40, by which the motor M is supplied with electricity. A depression pole 7 is normally and resiliently urged outward by a coil spring 41, the front tip end (lowermost) of which confronts the record face of the record disc.

An external force pushing down on the depression pole 7 against the urging given by the coil spring 41, gives rise to the retraction of the record disc 4 against the stylus force spring 8.

A speed controller 42, shown in FIGS. 1 and 2, is composed of a slide rheostat.

Shown in FIG. 1 is a stop 53 for the pickup 10, by which the pickup 10 is restricted from escaping outside the starting point of sound reproduction.

Figure 3:
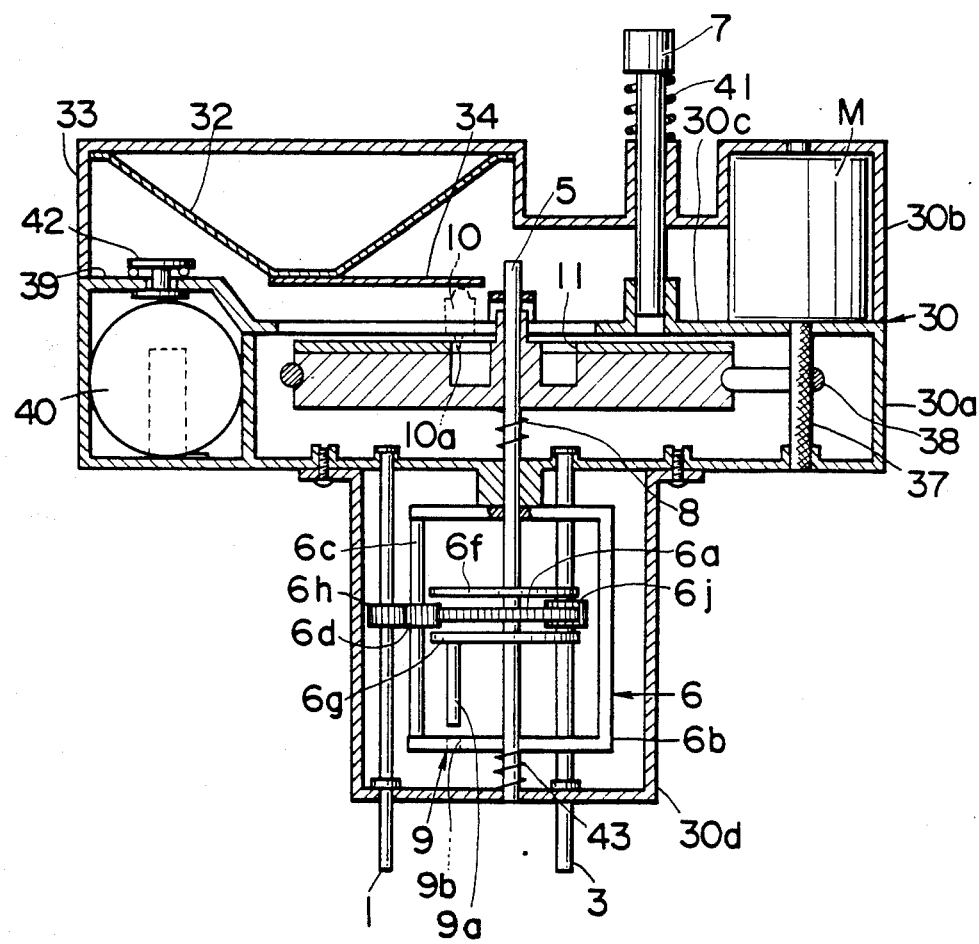
FIG. 3 is a sectional side view similar to FIG. 2 showing the pickup fallen into the stylus receiving recess.
Figure 4:
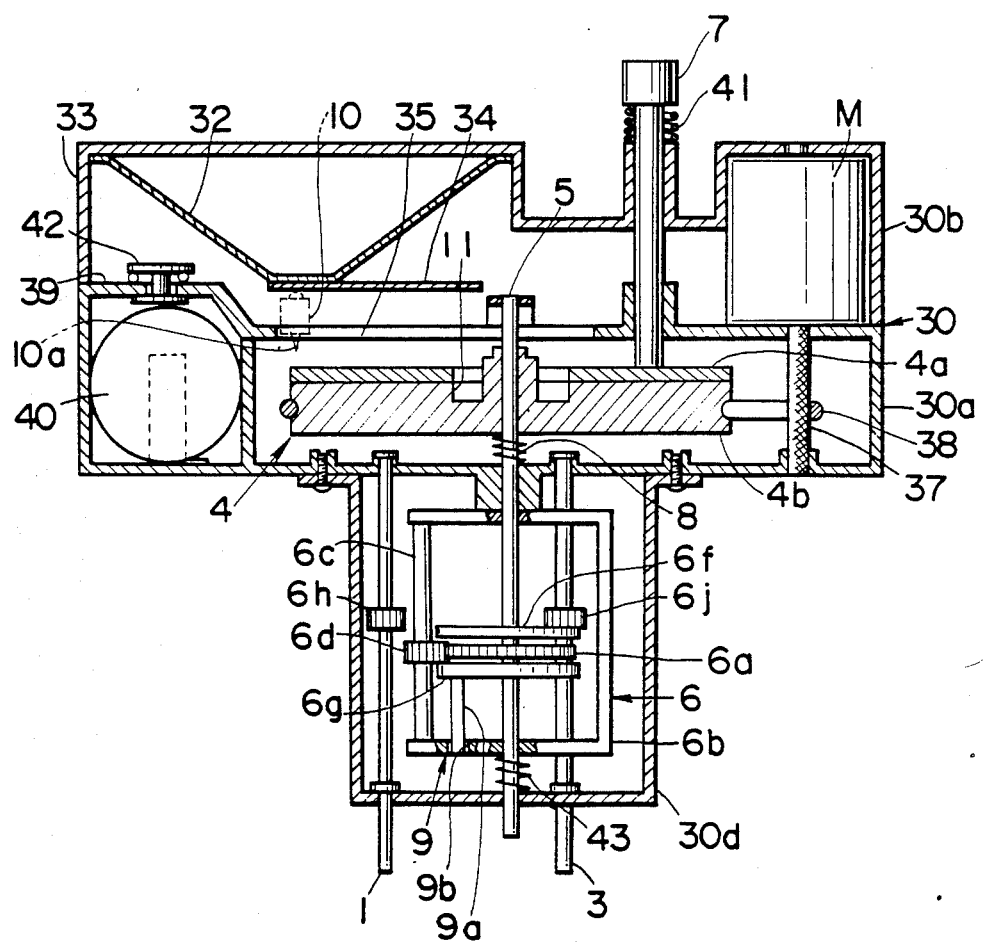
FIG. 4 is a sectional side view showing the interior of the device when the depression pole is pushed down.

As shown in FIGS. 2, 3 and 4, a gearbox 30d is disposed beneath and projecting from the chassis 30a, within which the center pin 5 extends and is journally received by the chassis 30a and further is journally received by the gearbox 30d at the other end.

Three external output shafts 1, 2 and 3 are journally received by the bottom plate of the chassis 30a below the rotating plane of the record disc 4 positioned to surround the center pin 5. The forward tip end of each external output shaft projects outside beyond the bottom plate of the gear box 30d. These external output shafts 1, 2 and 3 are positioned to be correlated to the content of the items recorded in the record grooves 1a, 1b and 1c, respectively.

Mounted within the gear box 30d is a transmission 6. The transmission includes a driving wheel, such as a driving gear wheel 6a fixed around the center pin 5, a pair of guide members 6f and 6g also attached axially to both sides of the center pin, that is, one on the advancing side of the driving wheel and the other on the retracting side of the driving wheel, a revolvable bearing frame member 6b which is journally received to be free relative to both the direction of revolution and axial movement, a planetary shaft 6c carried by the revolvable frame 6b, being in parallel with said center pin 5, an intermediate wheel, such as a planetary gear wheel 6d, supported by the planetary shaft 6c, capable of being moved in an axial direction and rotatable while being normally meshing with said driving wheel 6a and restricted by the pair of guide members 6f and 6g, driven wheels 6h, 6i and 6j fixedly coupled to each of the external output shafts 1, 2 and 3, so that each of the driven wheels can be meshed with said planetary wheel 6d when both the driving wheel 6a and the planetary wheel 6d are in an advanced position. The driven wheels are out of engagement with said planetary wheel 6d, when the driving wheel 6a and the planetary wheel 6d together are placed at a retracted position.

The condition under which both the driving wheel 6a and the planetary wheel 6d can advance occurs when any one of the record grooves has finished its sound reproduction and the pickup 10 has fallen into the stylus receiving recess 11 of the record disc 4, thereby the record disc has advanced accompanying the center pin 5 urged by the spring force of the stylus force spring 8. On the other hand, the driving wheel 6a and the planetary wheel 6d are retracted when the record disc 4 and the center pin 5 together are retracted against the resilient force of the stylus force spring 8 by an external force depressing on the depression pole 7.

Subsequent releasing of the depression pole 7 will maintain the pickup 10 between the record disc 4 and the sound transmitting member 34 under stylus pressure while retaining the record disc 4 at its retracted position. By virtue of this, both the driving wheel 6a and the planetary wheel 6d can be held at the retracted position.

Shown in FIGS. 2, 3 and 4, is a buffer spring 43.

The revolvable bearing frame member can be rotated by engaging means for coupling the revolvable bearing frame member to the center pin. For example, the coupling means can be constructed by providing the guide member 6g on the axial retraction side of the driving wheel 6a with a projection 9a parallel to the center pin 5, and the portion of the revolvable bearing frame member 6b confronting the guide member 6g, formed as a circular disc, provided with an aperture 9b at a location radially corresponding to the tip end of the projection 9a. The projection 9a and aperture 9b constitute the coupling member 9.

The projection 9a of the coupling member 9, as shown in FIG. 3, moves out of the aperture 9b of the coupling means when the reproducing device finishes playing one of the specific record grooves 1a, 1b, or 1c resulting in the pickup 10 falling into the stylus receiving recess 11 and allowing advancing movement of the record disc 4 together with the center pin 5 by means of the resilient force imparted by the stylus force spring 8. The projection 9a is inserted into the aperture 9b, as shown in FIGS. 2 and 4, when the record disc 4 is retracted, together with the center pin 5, against the resilient force of the stylus force spring 8 by an external force, namely the operator's pushing, on the depression pole 7, and subsequently when the pickup 10 is placed under stylus pressure, while it is clamped between the record disc 4 and the sound transmitting member 34, and is still sustaining the record disc 4 at its retracted position.

When the coupling member 9 is in its disengaged position, as shown in FIG. 3, the revolvable bearing frame member 6b cannot be driven by the center pin 5. However, when the coupling member 9 is in its engaged state as shown in FIGS. 2 and 4, the revolvable bearing frame member 6b is rotated together with the center pin 5.

The condition under which the coupling member 9 is placed in engagement is when the record disc 4 is retracted together with the center pin 5 by the depression pole 7 as explained above. At this instance, the projection 9a of the coupling member 9, at first, slidably contacts the inside face of the revolvable bearing frame member 6b, causing the revolvable bearing frame member 6b to retract while being supported by the buffer spring 43 and thus the excessive force by the depression pole can be absorbed.

The revolvable bearing frame member 6b may rotate slightly due to friction with the projection 9a, eventually the projection 9a but reaches and enters into the aperture 9b, provided that the strength of the buffer spring 43 is suitably settled.

It is apparent that the coupling means is not required to always be the combination of a projection and an aperture, but any coupling means can be used in which a center pin and the revolvable frame member can be frictionally rotated and the center pin alone can rotate when the revolution of the planetary wheel is stopped by the planetary wheel engaging with the driven wheel.

Explanation will now be made as to the manner of operation of the device in the embodiment described above.

When the pickup 10 is loaded with stylus pressure, as shown in FIG. 2, if a starting switch (not shown) is turned ON, the motor M will start rotation, which rotates the record disc 4 through the belt 38. Assuming that the pickup 10 is tracing one of the three record grooves, prior to reaching the end point of sound reproduction, the record disc 4 and the center pin 5 are at a retracted position being sustained by the speaker diaphragm 32, sound transmission member 34 and the pickup 10, and as a consequence, the driving wheel 6a, guide members 6f and 6g and the planetary wheel 6d are also at a retracted position.

Under this condition, the planetary wheel 6d is located in a retracted position along the planetary shaft 6c, being separated from the driven wheels 6h, 6i and 6j while the coupling means 9 is engaged, accompanying rotation of the revolvable bearing frame member 6b together with the center pin 5. In this position planetary wheel 6d revolves without meshing with any of the driven wheels 6h, 6i or 6j.

When the pickup 10 falls into the stylus receiving recess 11 formed on the central part of the record disc 4, the planetary wheel 6d will advance up to the plane on which the driven wheels 6h, 6i and 6j situate.

Figure 5:
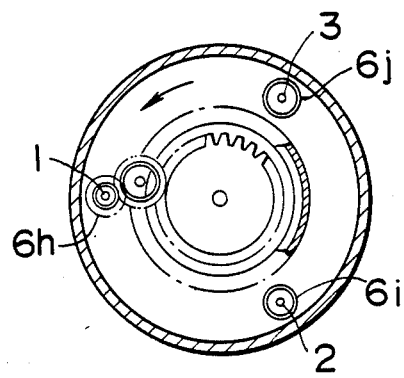
FIG. 5 is a sectional plan view taken along line 5—5 of FIG. 2.
Figure 6:
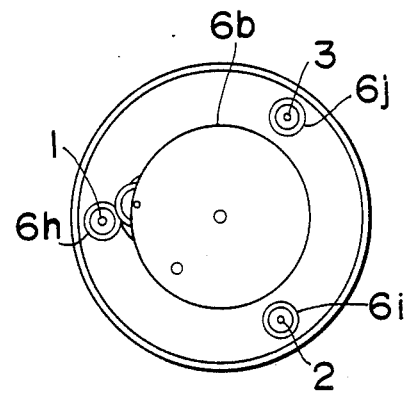
FIG. 6 is a sectional plan view taken along line 6—6 of FIG. 2.
Figure 7:
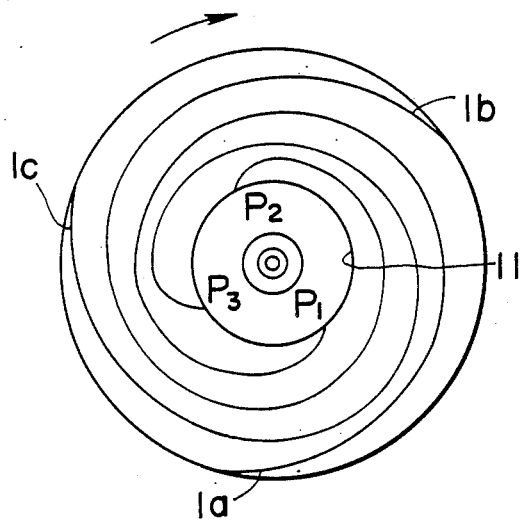
FIG. 7 is a plan view showing the top face of a record disc.

At this moment the position of the planetary wheel on its horizontal plane corresponds to the point P1, as shown in FIG. 7, where the end point of the record groove 1a crosses the stylus receiving recess 11, namely, midway between the output shafts 1 and 3, as shown in FIGS. 5 and 6.

Since the planetary wheel 6d revolves as particularly shown by the arrow line in FIG. 5, on the plane in which the driven wheels 6h, 6i, and 6j reside planetary wheel can engage only the driven wheel 6h carried on the output shaft 1 for its transmission to the external means.

Since the output shaft 1 is selected for playing an action corresponding to the content in the record groove 1a, it is possible to let the external means incorporating therein the sound reproduction devices of the present invention to play an action or motion corresponding to the content of the recorded item in the record groove 1a following reproduction of that recorded item. In reproducing other items recorded in the grooves 1b or 1c, the end points P2 or P3 of the respective grooves introduce pickup 10 into the stylus receiving recess 11 at positions as shown in FIG. 7, and the planetary wheel 6d begins to advance from the point where it can reach external output shaft 2 or 3 respectfully.

After the device has finished any specific motion, the depression pole 7 is pushed down to retract the record disc 4 and the center pin 5. This will retract the planetary wheel again from the horizontal plane on which the driven wheels 6h, 6i and 6j situate and allow it to rotate on a horizontal plane below the driven wheels. Under this situation, the pickup 10 reverts back to the starting point being urged by the return spring 36 (refer to FIG. 1) but stylus pressure is not imparted to the pickup 10 unless the operator takes his hand away from the depression pole 7. The stylus pressure can only be applied when the record disc slightly advances by the operator's releasing the force on the depression pole 7. It depends only on the timing of the stylus pressure to determine which record groove the pickup should engage, and this cannot be known to the user who cannot view the interior of the device.

It is possible to design the external means incorporating the device of the present invention to play several different actions or motions, each corresponding to the reproduced items, by relying only on the power means incorporated in the sound reproducing device.

It is also possible to provide a device which can utter voices and motions or actions in a sequential manner.

In addition, the present invention can be applied to such a device or devices as one in which only a small size motor need be used, because of the fact that the present invention does not apply a load to the motor to drive both the sound reproduction and to drive any other external means concurrently, but only allows application of one driving load.

I claim:

1. A simplified sound reproducing device comprising;
   a casing;
   a record disc enclosed within said casing having a record face with a plurality of record grooves each having a starting point of sound reproduction, and a stylus receiving recess at a portion on or passing over an end point of sound reproduction;
   a motor for driving said record disc;
   means for transferring rotational motion from said motor to said record disc;
   a speaker diaphragm fixedly disposed above said record disc;
   a sound transmitting member disposed on the bottom of said speaker diaphragm and extending in the direction parallel to the record face of said record disc;
   a stylus force spring urging said record disc toward said sound transmitting member;
   a depression pole, having one end facing said record face and another end extending outside of said casing, to retract said record disc by an external force depressing said pole against the urging of said stylus force spring;
   a pickup interposed between said sound transmitting member and said record disc, said pickup normally urged toward both the starting point of sound reproduction and said sound transmitting member so as to be returned to said starting point of sound reproduction when said record disc is retracted by said external force depressing said depression pole;
   a rotatable center pin fixedly attached to the center of rotation of said record disc capable of being rotated and axially advanced or retracted;
   a plurality of external output shafts disposed below the plane of rotation of said record disc and at locations corresponding to each of said end points of sound reproduction of said record grooves on said record disc, wherein each of said plurality of external output shafts actuates predetermined external components corresponding to said record groove's recorded content previously reproduced; and
   means for selectively transmitting rotational motion from said center pin to one of said plurality of external output shaft.

2. The simplified sound reproducing device of claim 1 wherein said selective transmitting means comprises a transmission having;
   a driving wheel fixed around said center pin below said record disc;
   a revolvable bearing frame member attached to said center pin enveloping said driving wheel, wherein said revolvable bearing frame member can be rotated when said pickup is applied with stylus pressure, and said revolvable bearing frame member can be stationary about said center pin when said pickup has fallen into said stylus receiving recess, and said revolvable bearing frame member is movable in an axial direction;
   means for biasing said revolvable bearing frame member in an axial direction;

means for coupling said revolvable bearing frame member with said center pin whereby said revolvable bearing frame member can be rotated in response to said coupling means being engaged;

a planetary shaft carried by said revolvable bearing frame;

a planetary gear wheel supported by said planetary shaft and capable of being movable in axial direction and is rotatable while meshing with said driving wheel;

a pair of guide members fixedly disposed to said center pin, one of said pair of guide members at a position axially in front of and the other at a position axially behind said driving wheel, wherein said pair of guide members allow said planetary wheel to mesh with said driving wheel while holding said planetary wheel from both sides thereby urging said planetary wheel to move axially together with said driving wheel; and a plurality of driven wheels, wherein one of said plurality of driven wheels is fixedly coupled to each of said external output shafts, so that any one of said plurality of driven wheels can be meshed with said planetary wheel when said driving wheel and said planetary wheel are in an advanced position, and said plurality of driven wheels are out of engagement with said planetary wheel when said driving wheel and said planetary wheel are placed in a retracted position.

3. The simplified sound reproducing device of claim 2, wherein said coupling means comprises frictional coupling means.

4. The simplified sound reproducing device of claim 2, wherein said coupling means comprises:

a coupling member projecting parallel to said center pin from one of said pair of guide members; and said revolvable bearing frame member having an aperture formed on one end confronting said coupling member wherein, said revolvable bearing frame member is normally and resiliently urged by said biasing means toward the advancing direction, and depressing said depression pole causes said center pin to retract, thereby moving said guide members, being fixedly disposed to said center pin, in a retracting direction, resulting in said coupling member slidably contacting said revolvable bearing frame member until said aperture is encountered, whereupon said coupling member enters into said aperture thereby imparting rotational motion to said revolvable bearing frame until said pickup falls into said stylus receiving recess, whereby said coupling member exists from said aperture, thereby disengaging said coupling means such that said planetary wheel can engage one of said plurality of driven wheels fixed to one of said plurality of external output shafts, said one of said plurality of external output shafts being selected by said selective transmitting means to actuate predetermined external components corresponding to said record groove's recorded content previously reproduced.

5. The simplified sound reproducing device of claim 2, wherein each of said driving wheel, planetary wheel and driven wheels are formed as a gear.

6. The simplified sound reproducing device of claim 1, wherein said rotational motion transferring means comprises a belt coupling said motor to said record disc.

7. The simplified sound reproducing device of claim 1, wherein said motor is an electric motor.

* * * * *